United States Patent
Lai et al.

(10) Patent No.: US 11,993,123 B2
(45) Date of Patent: May 28, 2024

(54) MECHANICAL LEG AND WHEELED MOBILE DEVICE

(71) Applicant: TENCENT TECHNOLOGY (SHENZHEN) COMPANY LIMITED, Shenzhen (CN)

(72) Inventors: Jie Lai, Shenzhen (CN); Dongsheng Zhang, Shenzhen (CN); Shuai Wang, Shenzhen (CN); Ke Chen, Shenzhen (CN); Sicheng Yang, Shenzhen (CN); Zhengyou Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/968,229

(22) Filed: Oct. 18, 2022

(65) Prior Publication Data
US 2023/0038600 A1    Feb. 9, 2023

Related U.S. Application Data (63) Continuation of application No. PCT/CN2021/101882, filed on Jun. 23, 2021.

(30) Foreign Application Priority Data

Aug. 12, 2020  (CN) .......................... 202010806731.0

(51) Int. Cl.
*B62D 57/028*    (2006.01)
*B60G 17/02*    (2006.01)
(Continued)

(52) U.S. Cl.
CPC ......... *B60G 17/025* (2013.01); *B60G 21/005* (2013.01); *B62D 61/12* (2013.01)

(58) Field of Classification Search
CPC ..... B62D 57/028; B62D 61/12; B60G 17/025
See application file for complete search history.

(56) References Cited

U.S. PATENT DOCUMENTS 9,475,191 B1    10/2016  Urata et al.
2016/0251044 A1*  9/2016  Klassen ............... B62D 57/028
                                                  180/8.7

FOREIGN PATENT DOCUMENTS

CN          2825410 Y        10/2006
CN      101380739 A    *    3/2009
(Continued)

OTHER PUBLICATIONS

Cai et al., Four-section wheel-track combined intelligent obstacle-crossing robot, Aug. 12, 2015, EPO, Machine Translation of Description (Year: 2015).*

(Continued)

*Primary Examiner* — James A English
(74) *Attorney, Agent, or Firm* — ANOVA LAW GROUP, PLLC (57) ABSTRACT

A mechanical leg comprises a frame, a retractable member, a wheel, an extension and retraction driving member, a travel driving member, an auxiliary leg, and an auxiliary wheel. The extension and retraction driving member is located on a side of the frame. The retractable member is connected to the extension and retraction driving member. The wheel is connected to the retractable member. The wheel is further connected to the travel driving member. A first end of the auxiliary leg is connected to the auxiliary wheel, and a second end of the auxiliary leg is located on the frame. The retractable member extends under the driving of the extension and retraction driving member to drive the wheel to jump. The wheel is driven by the travel driving member to move. When the auxiliary wheel contacts the (Continued)

ground, the mechanical leg moves with the rolling of the wheel and the auxiliary wheel.

20 Claims, 4 Drawing Sheets

(51) Int. Cl.
*B60G 21/00* (2006.01)
*B62D 61/12* (2006.01)

(56) References Cited

FOREIGN PATENT DOCUMENTS

| CN | 104340291 | Y |   | 2/2015 | | |
|----|-----------|---|---|--------|---|---|
| CN | 104828164 | A | * | 8/2015 | | |
| CN | 105539786 | A |   | 5/2016 | | |
| CN | 107600217 | A |   | 1/2018 | | |
| CN | 108638019 | A |   | 10/2018 | | |
| CN | 109501880 | A |   | 3/2019 | | |
| CN | 109533076 | A | * | 3/2019 | ........... | B62D 57/032 |
| CN | 109747729 | A |   | 5/2019 | | |
| CN | 110027643 | A |   | 7/2019 | | |
| CN | 110217311 | A |   | 9/2019 | | |
| CN | 110450878 | A |   | 11/2019 | | |
| CN | 111267989 | A |   | 6/2020 | | |
| CN | 111776106 | A |   | 10/2020 | | |
| JP | 2000072060 | A |   | 3/2000 | | |
| WO | 2017168000 | A1 |  | 10/2017 | | |

OTHER PUBLICATIONS

Chen et al., Collembolan-imitated jumping robot with crawling capacity, Mar. 29, 2019, EPO, Machine Translation of Description (Year: 2019).*

The World Intellectual Property Organization (WIPO) International Search Report for PCT/CN2021/101882 dated Sep. 7, 2021 8 Pages (including translation).

* cited by examiner

MECHANICAL LEG AND WHEELED MOBILE DEVICE

CROSS-REFERENCES TO RELATED APPLICATIONS

This application is a continuation application of PCT Patent Application No. PCT/CN2021/101882, entitled "MECHANICAL LEG AND WHEELED MOBILE DEVICE" and filed on Jun. 23, 2021, which claims priority to Chinese Patent Application No. 202010806731.0, filed on Aug. 12, 2020, the entire contents of both of which are incorporated herein by reference.

FIELD OF THE TECHNOLOGY

The present disclosure relates to the field of intelligent wheeled mobile device technologies, and in particular, to a mechanical leg and a wheeled mobile device.

BACKGROUND OF THE DISCLOSURE

A wheeled mobile device is a mechanical device that can perform a work task, for example, the wheeled mobile device can be applied in the manufacturing industry, the construction industry, or some hazardous work.

A wheel of a mechanical leg of the wheeled mobile device has an advantage in moving on flat ground but is less capable of overcoming an obstacle.

SUMMARY

Embodiments of the present disclosure provide a mechanical leg and a wheeled mobile device, to improve the passage capability of the mechanical leg:

An embodiment of the present disclosure provides a mechanical leg, where the mechanical leg includes a frame, a retractable member, a wheel, an extension and retraction driving member, a travel driving member, an auxiliary leg, and an auxiliary wheel. The extension and retraction driving member is located on a side of the frame, the retractable member is connected to the extension and retraction driving member, the wheel is connected to the retractable member and the travel driving member respectively, a first end of the auxiliary leg is connected to the auxiliary wheel, and a second end of the auxiliary leg is located on the frame. The retractable member is configured to drive the wheel to jump when being driven by the extension and retraction driving member to extend and retract, the wheel is driven by the travel driving member to move, and when the auxiliary wheel contacts the ground, the mechanical leg moves as the wheel and the auxiliary wheel roll. An embodiment of the present disclosure further provides a wheeled mobile device, including at least one of the foregoing mechanical leg provided in the embodiments of the present disclosure.

With the mechanical leg and the wheeled mobile device provided by the embodiments of the present disclosure, on a flat ground, a travel driving member of the mechanical leg can drive a wheel to move on the ground; when the mechanical leg meets with an obstacle, because the extension and retraction driving member is connected to a retractable member, the extension and retraction driving member can quickly exert a force on the retractable member, to deform the retractable member, and the force is then combined with a force of the travel driving member on the wheel, the mechanical leg can jump over the obstacle. It can be seen that, the mechanical leg can not only move fast on the flat ground, but also jump through the obstacle when encountering the obstacle, thus improving the passage capability of the mechanical leg.

BRIEF DESCRIPTION OF THE DRAWINGS

In order to explain technical solutions in embodiments of the present disclosure more clearly, the following is a brief introduction of the attached drawings required in the description of the embodiments. Obviously, the described attached drawings are some embodiments of the present disclosure. A person of ordinary skill in the art, based on the embodiments of the present disclosure without creative efforts, can obtain other attached drawings according to these attached drawings.

Reference numerals: 1. Frame; 2. Retractable member; 21. Thigh bar; 22. Shank bar; 23. First retractable member; 24. Second retractable member; 3. Wheel; 4. Extension and retraction driving member; 5. Travel driving member; 8. Auxiliary driving member; 6. Auxiliary leg; 7. Auxiliary wheel; 9. Elastic member; 91. First torsional arm; 92. Second torsional arm.

DESCRIPTION OF EMBODIMENTS

To make the objectives, technical solutions, and advantages of embodiments of the present disclosure clearer, the following describes the implementation method in the embodiments of the present disclosure in combination with the attached drawings in detail.

An embodiment of the present disclosure provides a mechanical leg, the mechanical leg can be applied to a wheeled mobile device, and can be a leg of the wheeled mobile device. The mechanical leg has a jump mode to overcome an obstacle. The mechanical leg can further switch between a two-wheel mode and a three-wheel mode.

For the convenience of introducing the embodiment, terms will be introduced, such as "up", "down", "left", "right", "before" and "after", "horizontal", "vertical" and "level", indicating location or position which is based on location or position shown in the attached drawings, are only for the purpose of describing the solutions, are not a limit. In addition, "first", "second" and "third" involved in the article are only used for describing the objectives, and cannot be understood as indicating or implying relative importance.

Figure 1:
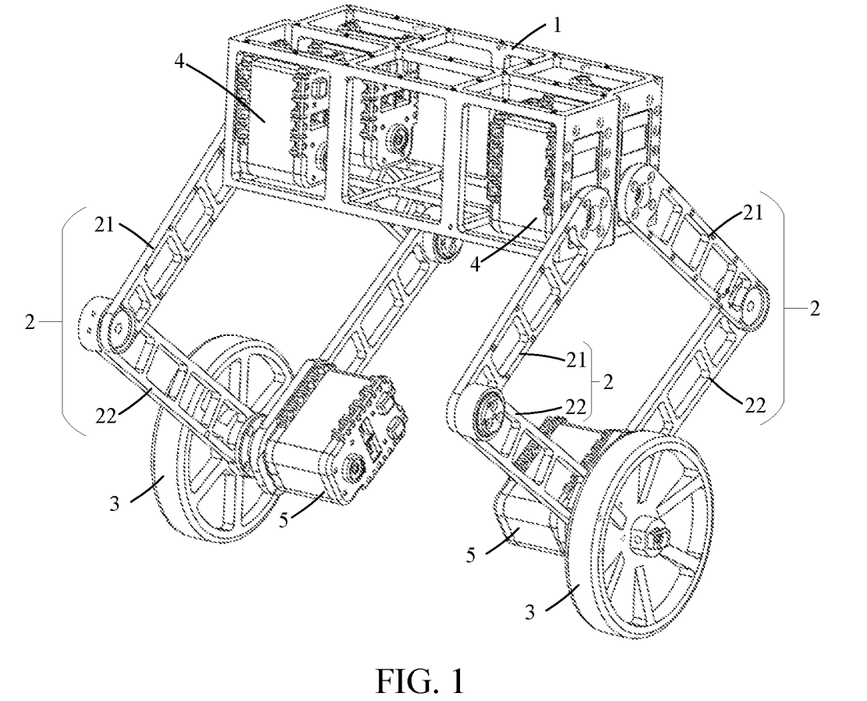
FIG. 1 is a schematic structural diagram of a mechanical leg according to an embodiment of the present disclosure.

FIG. 1 is a schematic structural diagram of the mechanical leg. The mechanical leg includes a frame 1, a retractable member 2, a wheel 3, an extension and retraction driving member 4, and a travel driving member 5; the extension and retraction driving member 4 is located on a side of the frame 1, the retractable member 2 is connected to the extension and retraction driving member 4, the wheel 3 is connected to the retractable member 2, and the wheel 3 is further connected to the travel driving member 5; the retractable member 2 extends or retracts under the driving of the extension and retraction driving member 4 to drive the wheel 3 to jump, and the wheel 3 is driven by the travel driving member 5 to move, for example, the wheel 3 can move on the ground under the driving of the travel driving member 5.

In an example, the frame 1 may be box-shaped or block-shaped, and has the top that may be platform-shaped to facilitate the mounting of a trunk of the wheeled mobile device to which the mechanical leg belongs. Alternatively, the frame 1 of the mechanical leg serves as the trunk or part of the trunk of the wheeled mobile device. This embodiment does not limit the structure of the frame 1 of the mechanical leg.

As shown in FIG. 1, the mechanical leg includes the retractable member 2, the retractable member 2 is a component that can extend and retract, so that the height of the mechanical leg can be adjusted, to make it convenient to gather strength to jump upward and overcome the obstacle. The retractable member 2 can be a retractable bar that can extend and retract, or can be a linkage mechanism that can extend and retract. This embodiment does not limit this, provided that the retractable member enables the height of the mechanical leg to be adjusted quickly to gather strength to jump upward and overcome the obstacle. This embodiment can take the retractable member 2 being a linkage mechanism as an example. The structure of the retractable member 2 will be introduced below.

In a process that the retractable member 2 is switching from a retracted state to an extended state, that is, the mechanical leg is switching from a crouching state to a standing state, when the retractable member 2 is in the retracted state, the mechanical leg is in the crouching state, and when the retractable member 2 is in the extended state, the mechanical leg is in the standing state. Therefore, when the retractable member 2 rapidly switches from the retracted state to the standing state, the mechanical leg rapidly switches from the crouching state to the standing state to jump upward.

As shown in FIG. 1, the mechanical leg further includes the extension and retraction driving member 4 configured to drive the retractable member 2 to extend or retract, the extension and retraction driving member 4 is connected to the retractable member 2 and configured to drive the retractable member 2 to extend or retract. For example, the extension and retraction driving member 4 may be a motor, an output shaft of which is connected to the retractable member 2. An end of the retractable member 2 away from the extension and retraction driving member 4 is connected to the wheel 3 of the mechanical leg. For example, one end of the retractable member 2 is connected to the output shaft of the extension and retraction driving member 4, and the other end of the retractable member 2 is connected to the wheel 3.

The extension and retraction driving member 4 is configured to drive the retractable member 2 to extend or retract, but the movement of the wheel 3 needs to be further driven by the travel driving member 5. Correspondingly, as shown in FIG. 1, the mechanical leg further includes the travel driving member 5, the travel driving member 5 is connected to the wheel 3, for example, the travel driving member 5 is also a motor, an output shaft of which is connected to a drive shaft of the wheel 3.

In this way, on a flat ground, the travel driving member 5 of the mechanical leg can drive the wheel 3 to move on the ground; when the mechanical leg meets with an obstacle, the extension and retraction driving member 4 can quickly exert a force on the retractable member 2 to make the retractable member 2 extend quickly, the mechanical leg jumps upward quickly, and the force is then combined with a force of the travel driving member 5 on the wheel 3, so that the mechanical leg can jump over the obstacle. It can be seen that, the mechanical leg can not only move fast on the flat ground, but also jump through the obstacle when encountering the obstacle, thus improving the passage capability of the mechanical leg.

The mechanical leg may include two legs, each leg corresponds to one wheel 3, and each wheel 3 may correspond to one retractable member 2, or each wheel 3 may correspond to two retractable members 2. When each wheel 3 corresponds to one retractable member 2, one retractable member 2 may correspond to one extension and retraction driving member 4. When each wheel 3 corresponds to two retractable members 2, two retractable members 2 corresponding to the same wheel 3 may also correspond to one extension and retraction driving member.

Whether each wheel 3 corresponds to one retractable member 2 or two retractable members 2 or more retractable members 2 is not limited in this embodiment, and can be flexibly set by the technical personnel according to an actual situation. This embodiment can take each wheel 3 being corresponding to two retractable members 2 as an example.

Whether each retractable member 2 corresponds to one extension and retraction driving member 4 or two extension and retraction driving members 4 is not limited in this embodiment, and can be flexibly set by the technical personnel according to an actual situation. This embodiment can take each retractable member 2 being corresponding to one extension and retraction driving member 4 as an example.

For example, each wheel 3 corresponds to two retractable members 2 and two extension and retraction driving members 4, and the retractable members 2 correspond to the extension and retraction driving members 4 one to one. In some embodiments, referring to FIG. 4, the side of the frame 1 includes a bulge part 401 and a non-bulge part 402. One extension and retraction driving member 4 is arranged on each of the bulge part 401 and the non-bulge part 402 respectively, so that the two extension and retraction driving members 4 corresponding to each wheel 3 are staggered on the side of the frame 1. A relative height difference between the bulge part 401 and the non-bulge part 402 makes the mechanical leg move without collision or friction between two thigh bars 21 on the same side and without collision or friction between two shank bars 22 on the same side.

Figure 3:
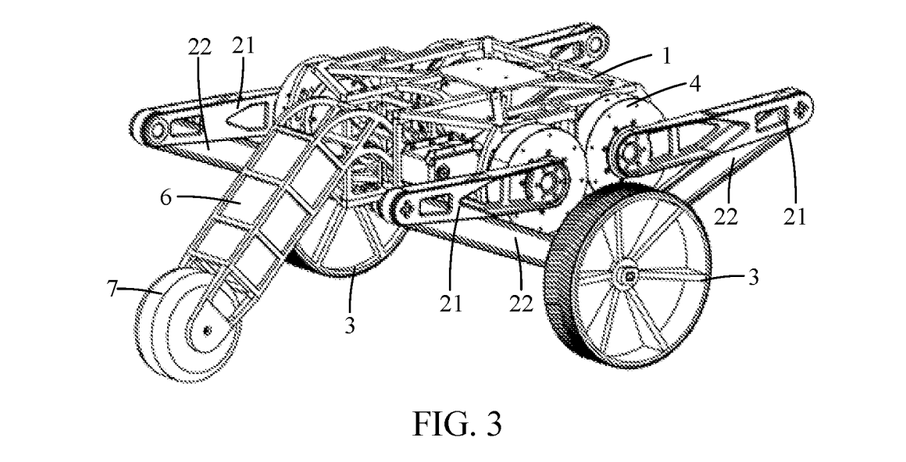
FIG. 3 is a schematic structural diagram of a mechanical leg in a first three-wheel mode according to an embodiment of the present disclosure.

In some embodiments, referring to FIG. 3, a groove is arranged on a part of the thigh bar 21 near a second end. When the thigh bar 21 is parallel to the ground, a part of the shank bar 22 near a first end is located in the groove and is engaged with the thigh bar 21. Therefore, when the mechanical leg is in the standing state, the thigh bar 21 can exert gravity on the shank bar 22 through an engagement point in the groove, so that the shank bar 22 can share the force, and then the extension and retraction driving member 4 can be in an idle state of not working.

Each wheel 3 corresponds to two retractable members 2, which can improve the connection strength between the frame 1 and the wheel 3 and improve the stability of the mechanical leg.

As mentioned above, the retractable member 2 may be the linkage mechanism, and correspondingly may include the thigh bar 21 and the shank bar 22, as shown in FIG. 1, where a first end of the thigh bar 21 is rotationally connected to the output shaft of the extension and retraction driving member 4, the second end of the thigh bar 21 is rotationally connected to the first end of the shank bar 22, and a second end of the shank bar 22 is mounted on the drive shaft of the wheel 3 by using a bearing.

The mechanical leg can include a left leg and a right leg, each leg may include two retractable members 2, each retractable member 2 may include a thigh bar 21 and a shank bar 22, the thigh bar 21 is connected to the shank bar 22, and a junction may be a leg joint. One end of the thigh bar 21 away from the leg joint can be referred to as a first end, and the other end that forms the leg joint can be referred to as a second end. One end of the shank bar 22 that forms the leg joint can be referred to as a first end, and the other end that is away from the leg joint can be referred to as a second end.

In an example, as shown in FIG. 1, the first end of the thigh bar 21 is connected to the output shaft of the extension and retraction driving member 4, and the second end of the shank bar 22 is mounted on the drive shaft of the wheel 3 by using a bearing. The first end of the thigh bar 21 is connected to the output shaft of the extension and retraction driving member 4, that is, the first end of the thigh bar 21 is fixedly connected to the output shaft of the extension and retraction driving member 4, so that when the output shaft of the extension and retraction driving member 4 rotates, the thigh bar 21 can be driven to move.

The thigh bar 21 is connected to shank bar 22 to form a leg joint. For example, the second end of the thigh bar 21 is hinged to the first end of the shank bar 22. For example, the second end of the thigh bar 21 is connected to the first end of the shank bar 22 by a revolving joint, so that a relative rotation can occur between the thigh bar 21 and the shank bar 22, and the retractable member 2 including the thigh bar 21 and the shank bar 22 can extend or retract.

A bent state of the leg joint of the retractable member 2 can be referred to as the retracted state, and a straightened state of the leg joint of the retractable member 2 can be referred to as the extended state, which can also be referred to as an elongated state or an expansion state. For example, the state in which the leg joint of the retractable member 2 is extremely bent can be referred to as a full retracted state, and the state in which the leg joint of the retractable member 2 is extremely extended can be referred to as a full extended state. Definitely, the full retracted state is not limited to the extreme bending of the leg joint, and the full retracted state may also be achieved when the leg joint is bent to be in another state. Similarly, the full extended state is not limited to the extreme extending of the leg joint, and the full extended state may also be achieved when the leg joint is extended to be in another state.

Figure 4:
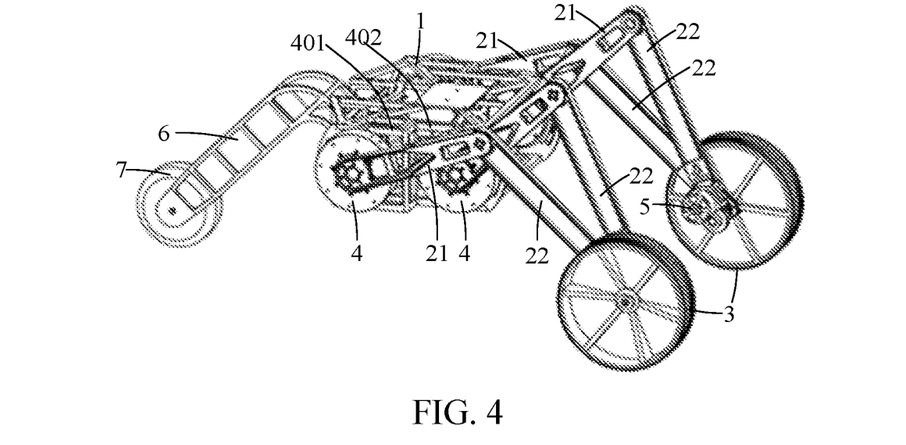
FIG. 4 is a schematic structural diagram of a mechanical leg in a second three-wheel mode according to an embodiment of the present disclosure.

For example, when the thigh bar 21 and the shank bar 22 are collinear, the leg joint of the retractable member 2 is in the straightened state, the retractable member 2 is in the extended state, and the mechanical leg is in the standing state. In another example, when there is an angle between the thigh bar 21 and the shank bar 22, as shown in FIG. 3 and FIG. 4, the leg joint of the retractable member 2 is in the bent state, the retractable member 2 is in the retracted state, and the mechanical leg is in the crouching state.

The second end of the shank bar 22 away from the leg joint is arranged on the drive shaft of the wheel 3. For example, the second end of the shank bar 22 is mounted on the drive shaft of the wheel 3 by using the bearing. In this way, the connection between the shank bar 22 and the wheel 3 is realized, and the relative rotation between the shank bar 22 and the wheel 3 is further realized, for example, the wheel 3 can rotate relative to the shank bar 22.

Figure 6:
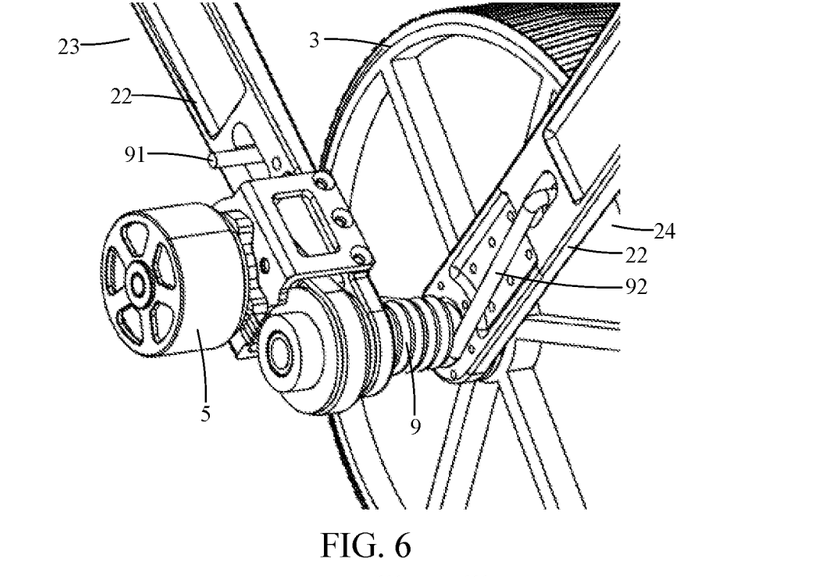
FIG. 6 is a schematic partial structural diagram of a mechanical leg according to an embodiment of the present disclosure.

The drive shaft of the wheel 3 is connected to the travel driving member 5. For example, the output shaft of the travel driving member 5 can be in spline connection or fixed connection to the drive shaft of the wheel 3, or the output shaft of the travel driving member 5 can be integrated with the drive shaft of the wheel 3. Alternatively, as shown in FIG. 6, the output shaft of the travel driving member 5 is connected to the drive shaft of the wheel 3 through a synchronous belt. When the output shaft of the travel driving member 5 rotates, the drive shaft of the wheel 3 can be driven by the synchronous belt to rotate, and then the wheel 3 is driven to move.

This embodiment does not limit a fixed connection method between the drive shaft of the wheel 3 and the output shaft of the travel driving member 5, only if the drive shaft of the wheel 3 is driven to rotate when the travel driving member 5 rotates, to drive the wheel 3 to move in the fixed connection method.

In an example, each wheel 3 may correspond to one travel driving member 5, or two wheels 3 may correspond to one travel driving member 5. For example, if the mechanical leg always moves in a straight line, the two wheels 3 may use the same travel driving member 5. In another example, if the mechanical leg will involve turning in the process of movement, each wheel 3 can use one travel driving member 5, so that the driving of the two wheels 3 is relatively independent, and the rotational speeds of the two wheels can be different to facilitate the turning of the mechanical leg. This embodiment does not limit whether each wheel 3 corresponds to one travel driving member 5 or two travel driving members 5, and each wheel 3 being corresponding to one travel driving member 5 may be taken as an example.

Based on the above description, when the mechanical leg moves on the flat ground, the retractable member 2 between the frame 1 and the wheel 3 can be in the elongated state or the retracted state, and the wheel 3 moves under the driving of the travel driving member 5. In the movement, when the mechanical leg encounters the obstacle, if the retractable member 2 is in the retracted state, the extension and retraction driving member 4 controls the retractable member 2 to extend quickly; and if the retractable member 2 is in the extended state, the extension and retraction driving member 4 controls the retractable member 2 to retract, and then controls the retractable member 2 to extend quickly. In this way, in the process of rapid extension of the retractable member 2, the mechanical leg can jump upward and overcome the obstacle.

Figure 2:
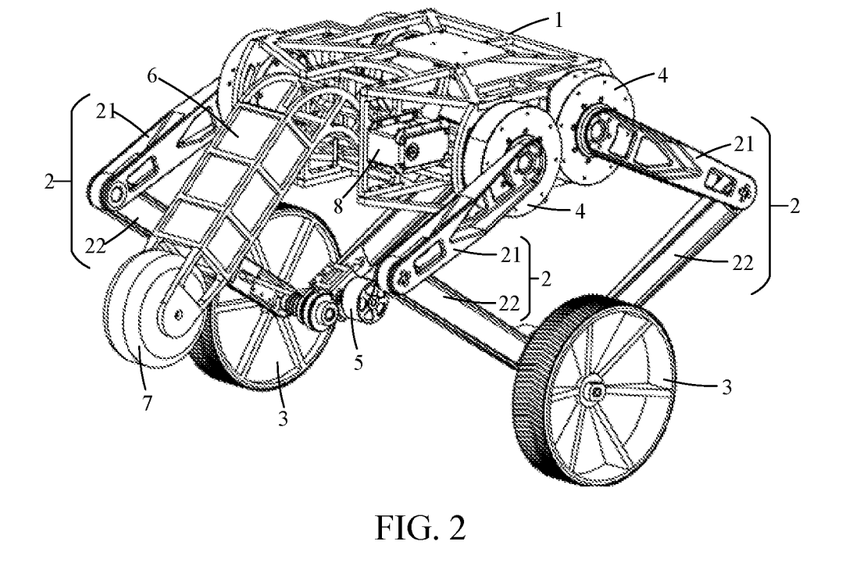
FIG. 2 is a schematic structural diagram of a mechanical leg according to an embodiment of the present disclosure.

In an example, as shown in FIG. 2, the mechanical leg further includes an auxiliary leg 6 and an auxiliary wheel 7. The auxiliary wheel 7 is connected to a first end of the auxiliary leg 6, and a second end of the auxiliary leg 6 is located on the frame 1. When the retractable member 2 retracts until the auxiliary wheel 7 contacts the ground, the mechanical leg moves with the rolling of the wheel 3 and the auxiliary wheel 7.

The auxiliary leg 6 can also be referred to as a counterweight leg of the mechanical leg, which can be configured to adjust the center of gravity of the mechanical leg to maintain the stability of the mechanical leg.

The retractable member 2 can be extended until the auxiliary wheel 7 leaves the ground, or the retractable member 2 can retract until the auxiliary wheel 7 contacts the ground.

In an example, one end of the auxiliary leg 6 is connected to the auxiliary wheel 7, and the other end of the auxiliary leg 6 is mounted on the frame 1. In order to improve the stability of the mechanical leg, the auxiliary leg 6 can be located between two retractable members 2. For example, the two retractable members 2 are located on the left side and the right side of the frame 1, the auxiliary leg 6 can be located on the front side or the rear side of the frame 1, and the two wheels 3 and the auxiliary wheel 7 are not collinear. In this way, when the auxiliary wheel 7 is located on the ground, the two wheels and the auxiliary wheel can form a triangle, which has a high stability, and thus can improve the stability of the mechanical leg.

In this way, when the auxiliary wheel 7 of the mechanical leg leaves the ground, the mechanical leg moves on the ground through the two wheels 3. When the auxiliary wheel 7 of the mechanical leg contacts the ground, the mechanical leg moves on the ground through the two wheels 3 and the auxiliary wheel 7. Furthermore, the mechanical leg can switch between a two-wheel mode and a three-wheel mode. For example, when the mechanical leg is required to move quickly, the mechanical leg can switch to the two-wheel mode, and when the mechanical leg is required to bear a load, the mechanical leg can switch to the three-wheel mode. Thus, the application flexibility of the mechanical leg can be improved.

The auxiliary wheel 7 can contact the ground not only through the retraction of the retractable member 2, but also through the rotation of the auxiliary leg 6 relative to the frame 1. The implementation will be introduced when the rotation of the auxiliary leg 6 relative to the frame 1 is introduced below.

As mentioned above, there may be two wheels 3, which can be referred to as a left wheel and a right wheel respectively, and can be located on opposite sides of the frame 1. The auxiliary wheel 7 can be located on a side of the frame 1 and between the two wheels 3. For example, the auxiliary wheel 7 can be located on a front side or a rear side of the frame 1. In this way, as shown in FIG. 3, when leg joints of two retractable members 2 connected to the same wheel 3 are bent in opposite directions, the mechanical leg is in a first three-wheel mode; and as shown in FIG. 4, when leg joints of two retractable members 2 connected to the same wheel 3 are bent in the same direction, the mechanical leg is in a second three-wheel mode.

The leg joint of the retractable member 2 is a rotary junction of the thigh bar 21 and the shank bar 22 of the retractable member 2.

In an example, as shown in FIG. 3, for the two retractable members 2 of the same wheel 3, when the leg joints of the two retractable members 2 are bent outwards, the retractable members 2 can be in the retracted state, and the auxiliary wheel 7 connected to the auxiliary leg 6 can contact the ground. This mode can be referred to as the first three-wheel mode of the mechanical leg. The leg joints of the two retractable members 2 are bent outwards, for example, the leg joints of the two retractable members 2 are bent away from each other.

As shown in FIG. 4, for the two retractable members 2 of the same wheel 3, when the leg joints of the two retractable members 2 are both bent in the same direction, the retractable members 2 can also be in the retracted state, and the auxiliary wheel 7 connected to the auxiliary leg 6 can also contact the ground. This mode can be referred to as the second three-wheel mode of the mechanical leg. The second three-wheel mode can also be a crawling mode of the mechanical leg. The second three-wheel mode has stronger stability and can be applied in a working environment with large load bearing.

Figure 5:
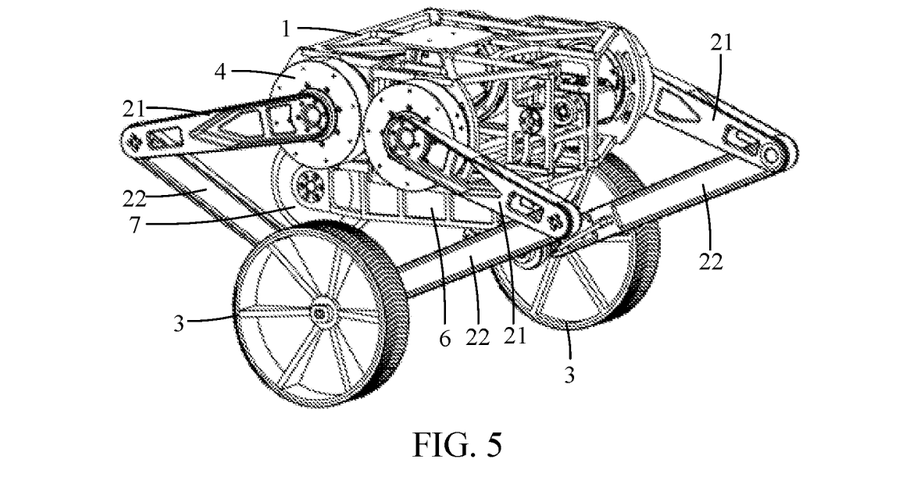
FIG. 5 is a schematic structural diagram of an auxiliary leg of a mechanical leg retracting to a position under a frame according to an embodiment of the present disclosure.

In an example, as shown in FIG. 5, the mechanical leg further includes an auxiliary driving member 8. The auxiliary driving member 8 is located on the side of the frame 1, and the second end of the auxiliary leg 6 is connected to an output shaft of the auxiliary driving member 8; the auxiliary leg 6 can extend to the side of the frame 1 and retract to a position under of the frame 1 under the driving of the auxiliary driving member 8.

The auxiliary driving member 8 is configured to drive the auxiliary leg 6 to move relative to the frame 1.

In an example, the auxiliary driving member 8 may be located on the front of the frame 1, or the auxiliary driving member 8 may be located on the back of the frame 1. The output shaft of the auxiliary driving member 8 is connected to the second end of the auxiliary leg 6, and the first end of the auxiliary leg 6 is rotationally connected to the auxiliary wheel 7. The output shaft of the auxiliary driving member 8 is connected to the second end of the auxiliary leg 6, for example, the output shaft of the auxiliary driving member 8 is fixedly connected to the second end of the auxiliary leg 6, so that when the output shaft of the auxiliary driving member 8 rotates, the auxiliary leg 6 can be driven to have the position adjusted relative to the frame 1, for example, extend from the frame 1 or retract to a position under the frame 1.

In this way, when the mechanical leg bears a load without the auxiliary leg 6, the auxiliary driving member 8 can drive the auxiliary leg 6 to rotate, so that the auxiliary leg 6 retracts to a position under the frame 1. For a schematic diagram of the auxiliary leg 6 retracting to a position under the frame 1, reference can be made to FIG. 5.

When the mechanical leg bears a load in need of the auxiliary leg 6, or when the mechanical leg needs to switch to the three-wheel mode, the auxiliary driving member 8 can drive the auxiliary leg 6 to rotate relative to the frame 1 to extend from the frame 1, and then in collaboration with the retraction of the retractable member 2, the auxiliary wheel 7 can contact the ground, as shown in FIG. 3 and FIG. 4. It can be seen that, the auxiliary wheel 7 can contact the ground with the retraction of the retractable member 2 and rotation of the auxiliary leg 6 relative to the frame 1. Definitely, when the auxiliary leg 6 is relatively long, the auxiliary wheel 7 can also contact the ground only by rotation of the auxiliary leg 6 relative to the frame 1. The method of realizing the contact between the auxiliary wheel 7 and the ground is not limited in this embodiment, and can be flexibly set according to actual needs.

In an example, the auxiliary driving member 8 can further drive the auxiliary leg 6 to adjust the position relative to the frame 1 to adjust the center of gravity of the mechanical leg, maintaining the mechanical leg in a stable state. For example, the position of the center of gravity of the mechanical leg may change in the process of jumping upward. The center of gravity of the mechanical leg can be adjusted by adjusting the position of the auxiliary leg 6 relative to the frame 1. In another example, if the frame 1 of the mechanical leg further has components such as a trunk and a mechanical arm, during movement of the mechanical leg, as the mechanical arm swings back and forth, the wheeled mobile device to which the mechanical leg belongs can also have the change in the position of the center of gravity. Therefore, the position of the auxiliary leg 6 relative to the frame 1 can also be adjusted through the auxiliary driving member 8, to dynamically adjust the center of gravity of the wheeled mobile device, maintaining the stability of the wheeled mobile device.

Figure 7:
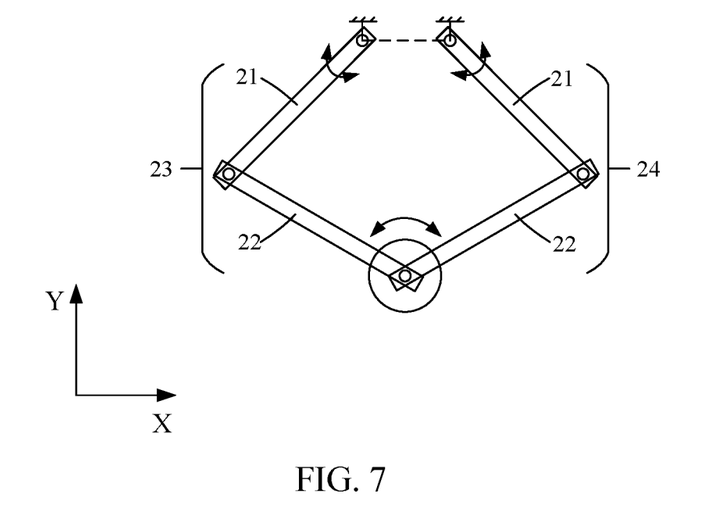
FIG. 7 is a schematic structural diagram of a retractable member of a mechanical leg according to an embodiment of the present disclosure.

In an example, when the mechanical leg jumps upward, in order to gather energy, and provide jumping buffer, correspondingly, as shown in FIG. 6 and FIG. 7, the mechanical leg further includes an elastic member 9, the elastic member 9 is connected between a shank bar 22 of a first retractable member 23 of two retractable members 2 and a shank bar 22 of a second retractable member 24 of the two retractable members 2.

As mentioned above, one wheel 3 can correspond to two retractable members 2. In order to distinguish the two retractable members 2, as shown in FIG. 7, they can be referred to as a first retractable member 23 and a second retractable member 24 respectively.

In an example, the elastic member 9 may be a torsional spring. As shown in FIG. 6, the torsional spring is sleeved on the drive shaft of the wheel 3, a first torsional arm 91 of the torsional spring is connected to the shank bar 22 of the first retractable member 23, and a second torsional arm 92 of the torsional spring is connected to the shank bar 22 of the second retractable member 24.

In an example, the torsional spring includes a spiral cylinder, the first torsional arm 91, and the second torsional arm 92. The spiral cylinder may be sleeved on the drive shaft of the wheel 3, the first torsional arm 91 is connected to the shank bar 22 of the first retractable member 23, and the second torsional arm 92 is connected to the shank bar 22 of the second retractable member 24. For example, the first torsional arm 91 may press against the shank bar 22 of the first retractable member 23, and the second torsional arm 92 may press against the shank bar 22 of the second retractable member 24. In another example, as shown in FIG. 6, the shank bar 22 of the first retractable member 23 has a long-strip shaped through-hole for the first torsional arm 91 to pass through, and the shank bar 22 of the second retractable member 24 has a long-strip shaped through-hole for the second torsional arm 92 to pass through. The first torsional arm 91 and the second torsional arm 92 may be located in the corresponding long-strip shaped through-holes respectively. In addition, when the shank bar 22 of the first retractable member 23 and the shank bar 22 of the second retractable member 24 are far away from each other, an end portion of the first torsional arm 91 located in the long-strip shaped through-hole may move in the long-strip shaped through-hole, and an end portion of the second torsional arm 92 located in the long-strip shaped through-hole may move in the long-strip shaped through-hole.

In this way, when the first retractable member 23 and the second retractable member 24 connected to the same wheel 3 switch from the retracted state to the elongated state, the first torsional arm 91 of the torsional spring will exert tension on the shank bar 22 of the first retractable member 23, and the second torsional arm 92 will exert tension on the shank bar 22 of the second retractable member 24. In the foregoing process, a driving function of the extension and retraction driving member 4 further exists. Therefore, in the process that the extension and retraction driving member 4 drives the first retractable member 23 and the second retractable member 24 to quickly extend, the torsional spring can accelerate quick switching of the first retractable member 23 and the second retractable member 24 from the full retracted state to the full extended state, so that the mechanical leg switches from the crouching state to the standing state quickly, and the mechanical leg jumps upward. The elastic member 9 may gather energy for upward jumping of the mechanical leg.

In another example, the elastic member 9 may alternatively be a spring, one end of the spring is connected to the shank bar 22 of the first retractable member 23, and the other end of the spring is connected to the shank bar 22 of the second retractable member 24. When the first retractable member 23 and the second retractable member 24 connected to the same wheel 3 switch from the retracted state to the elongated state, in the process of returning from a stretched state, the spring exerts tension on the first retractable member 23 and exerts tension on the second retractable member 24. Therefore, in the process that the extension and retraction driving member 4 drives the first retractable member 23 and the second retractable member 24 to quickly extend, the spring connected between the shank bar 22 of the first retractable member 23 and the shank bar 22 of the second retractable member 24 can accelerate quick switching of the first retractable member 23 and the second retractable member 24 from the full retracted state to the full extended state, and the mechanical leg jumps upward. The elastic member 9 may gather energy for upward jumping of the mechanical leg.

This embodiment does not limit the structural form of the elastic member 9, only if the structural form can accelerate the quick extension of the retractable member 2 and prompt the mechanical leg to jump upward. The elastic member 9 being the torsional spring may be taken as an example in the accompanying drawing.

Figure 8:
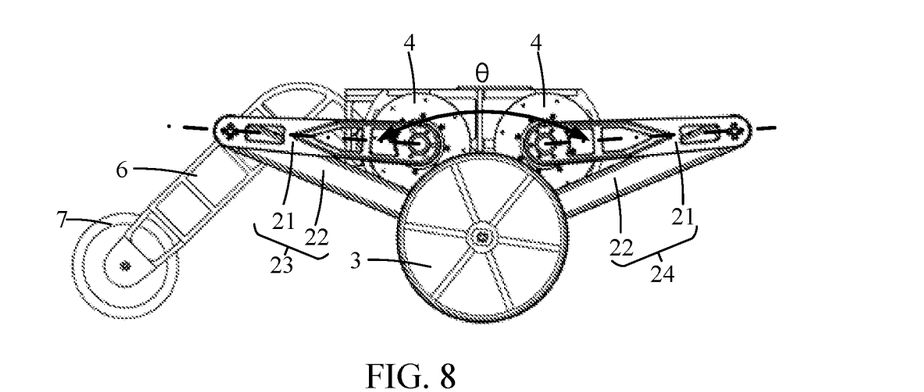
FIG. 8 is a schematic structural diagram of a mechanical leg according to an embodiment of the present disclosure.

In an example, when an angle between the thigh bars 21 of the first retractable member 23 and the second retractable member 24 connected to the same wheel 3 is small, for example, as shown in FIG. 8, when the angle between the thigh bar 21 of the first retractable member 23 and the thigh bar 21 of the second retractable member 24 connected to the same wheel 3 is small, the torsional spring may be in a natural state. If the torsional spring is in the natural state, the elastic member 9 exerts no force on the shank bar 22 of the first retractable member 23 and the shank bar 22 of the second retractable member 24, and therefore the extension and retraction driving member 4 configured to drive the first retractable member 23 and the extension and retraction driving member 4 configured to drive the second retractable member 24 may not be in the working state, that is, not in a driving state.

Figure 9:
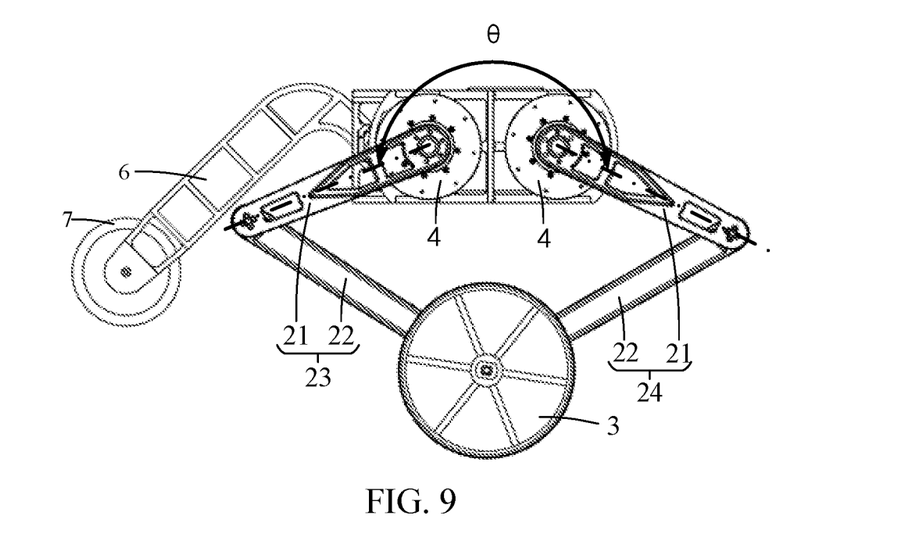
FIG. 9 is a schematic structural diagram of a mechanical leg according to an embodiment of the present disclosure.

When an angle between the thigh bars 21 of the first retractable member 23 and the second retractable member 24 connected to the same wheel 3 is large, for example, as shown in FIG. 9, when the angle between the thigh bar 21 of the first retractable member 23 and the thigh bar 21 of the second retractable member 24 connected to the same wheel 3 is large, the torsional spring is likely to be in the stretched state. If the torsional spring is in the stretched state, the first torsional arm 91 of the elastic member 9 exerts tension on the shank bar 22 of the first retractable member 23, and the second torsional arm 92 of the elastic member 9 exerts tension on the shank bar 22 of the second retractable member 24, to maintain the stability of the first retractable member 23 and the second retractable member 24. Correspondingly, the extension and retraction driving member 4 configured to drive the first retractable member 23 and the extension and retraction driving member 4 configured to drive the second retractable member 24 are in the working state, that is, in the driving state, to balance forces exerted by the elastic member 9 on the first retractable member 23 and the second retractable member 24.

Based on the above description, the mechanical leg includes the frame 1, the plurality of retractable members 2, the plurality of wheels 3, the auxiliary leg 6, and the auxiliary wheel 7, where each wheel 3 is connected to two retractable members 2, and the auxiliary leg 6 and the auxiliary wheel 7 are in one-to-one correspondence. For example, the mechanical leg may have two legs, the quantity of wheels 3 is two, the quantity of retractable members 2 is four, and both the quantity of auxiliary legs 6 and the quantity of auxiliary wheels 7 are one.

Two retractable members 2 connected between the frame 1 and one wheel 3 may be used as the left leg of the mechanical leg, and the other two retractable members 2 connected between the frame 1 and the other wheel 3 may be used as the right leg of the mechanical leg.

The mechanical leg further includes extension and retraction driving members 4 configured to drive the retractable members 2 to extend or retract, and travel driving members 5 configured to drive the wheels 3 to move. In this way, the two wheels 3 move on the ground under the driving of their respective corresponding travel driving members 5. When encountering an obstacle, the extension and retraction driving members 4 drive their respective corresponding retractable members 2 to quickly switch from the full retracted state to the full extended state, prompting the mechanical leg to jump upward and overcome the obstacle. It can be seen that, the mechanical leg can not only move fast on the flat ground, but also jump through the obstacle when encountering the obstacle, thus improving the passage capability of the mechanical leg.

The elastic member 9 is further connected between the shank bars 22 of the two retractable members 2 corresponding to the same wheel 3. The elastic member 9, on the one hand, may prompt the retractable member 2 to switch from the full retracted state to the full extended state, gathering energy for the mechanical leg to jump up, and on the other hand, the elastic member may further provide the buffer force for the mechanical leg contacting the ground after jumping.

The mechanical leg further includes the auxiliary leg 6 and the auxiliary wheel 7, the auxiliary wheel 7 is mounted on one end of the auxiliary leg 6, and the other end of the auxiliary leg 6 is mounted on the frame 1. When the auxiliary wheel 7 contacts the ground, the mechanical leg is in the three-wheel mode, and can move on the ground in the three-wheel mode with stronger stability. When the auxiliary wheel 7 does not contact the ground, the mechanical leg is in the two-wheel mode and can move on the ground in the two-wheel mode at a higher moving speed.

In addition, the three-wheel mode of the mechanical leg further has the first three-wheel mode shown in FIG. 3 and the second three-wheel mode shown in FIG. 4, which improves the use flexibility of the mechanical leg.

When contacting the ground, the auxiliary wheel 7 may also play a load-bearing role, enabling the mechanical leg to bear a heavy trunk or cargo.

The mechanical leg further includes the auxiliary driving member 8, and the auxiliary driving member 8 can drive the auxiliary leg 6 to rotate relative to the frame 1, and dynamically adjust the position of the auxiliary leg 6 relative to the frame 1 to dynamically adjust the center of gravity of the mechanical leg and improve the stability of the mechanical leg. If the mechanical leg belongs to the wheeled mobile device, the adjustment of the position of the auxiliary leg 6 relative to the frame 1 can also dynamically adjust the center of gravity of the wheeled mobile device to improve the stability of the wheeled mobile device. In addition, the auxiliary leg 6 can retract to a position under the frame 1 when the auxiliary leg 6 is not required.

In this embodiment of the present disclosure, on a flat ground, the travel driving member of the mechanical leg can drive the wheel to move on the ground; when the mechanical leg meets with the obstacle, the extension and retraction driving member can quickly exert a force on the retractable member to make the retractable member extend quickly, the mechanical leg jumps upward quickly, and the force is combined with a force of the travel driving member on the wheel, so that the mechanical leg can jump over the obstacle. It can be seen that, the mechanical leg can not only move fast on the flat ground, but also jump through the obstacle when encountering the obstacle, thus improving the passage capability of the mechanical leg.

An embodiment of the present disclosure further provides a wheeled mobile device, and the wheeled mobile device includes the mechanical leg mentioned above. The wheeled mobile device can be a mobile robot. As mentioned above, the wheeled mobile device is on a flat ground, a travel driving member of the mechanical leg can drive a wheel to move on the ground; when the mechanical leg meets with an obstacle, an extension and retraction driving member can quickly exert a force on a retractable member to make the retractable member extend quickly, the mechanical leg jumps upward quickly, and the force is combined with a force of the travel driving member on the wheel, so that the mechanical leg can jump over the obstacle. It can be seen that, the mechanical leg can not only move fast on the flat ground, but also jump through the obstacle when encountering the obstacle, thus improving the passage capability of the mechanical leg.

The foregoing is only an optional embodiment of the present disclosure and does not limit the present disclosure. Any modification, equivalent replacement, improvement made in the spirit and principles of the present disclosure shall be included in the protection scope of the present disclosure.

What is claimed is:

1. A mechanical leg, the mechanical leg comprising a frame, a retractable member, a wheel, an extension and retraction driving member, a travel driving member, an auxiliary leg, and an auxiliary wheel, wherein the extension and retraction driving member is located on a side of the frame, the retractable member is connected to the extension and retraction driving member, the wheel is connected to the retractable member and the travel driving member respectively, a first end of the auxiliary leg is connected to the auxiliary wheel, and a second end of the auxiliary leg is located on the frame; and the retractable member is configured to drive the wheel to jump when being driven by the extension and retraction driving member to extend and retract, the wheel is driven by the travel driving member to move, and when the auxiliary wheel contacts the ground, the mechanical leg moves as the wheel and the auxiliary wheel roll.

2. The mechanical leg according to claim 1, further comprising an auxiliary driving member, wherein the auxiliary driving member is located on the side of the frame, and the second end of the auxiliary leg is connected to an output shaft of the auxiliary driving member; and the auxiliary leg is configured to extend to the side of the frame and retract to a position under the frame under the driving of the auxiliary driving member.

3. The mechanical leg according to claim 2, wherein the auxiliary leg is further configured to rotate relative to the frame under the driving of the auxiliary driving member to adjust the center of gravity of the mechanical leg.

4. The mechanical leg according to claim 1, wherein the retractable member is a linkage mechanism comprising a thigh bar and a shank bar; and
a first end of the thigh bar is rotationally connected to an output shaft of the extension and retraction driving member, a second end of the thigh bar is rotationally connected to a first end of the shank bar, and a second end of the shank bar is mounted on a drive shaft of the wheel by using a bearing.

5. The mechanical leg according to claim 4, wherein each wheel corresponds to two retractable members and two extension and retraction driving members, and the retractable members correspond to the extension and retraction driving members one to one.

6. The mechanical leg according to claim 5, wherein the mechanical leg further comprises an elastic member, and the elastic member is connected between a shank bar of a first retractable member of the two retractable members and a shank bar of a second retractable member of the two retractable members.

7. The mechanical leg according to claim 6, wherein the elastic member is a torsional spring, the torsional spring is sleeved on the drive shaft of the wheel, a first torsional arm of the torsional spring is connected to the shank bar of the first retractable member, and a second torsional arm of the torsional spring is connected to the shank bar of the second retractable member.

8. The mechanical leg according to claim 6, wherein the elastic member is a spring, one end of the spring is connected to the shank bar of the first retractable member, and the other end of the spring is connected to the shank bar of the second retractable member.

9. The mechanical leg according to claim 5, wherein the side of the frame comprises a bulge part and a non-bulge part; and
the two extension and retraction driving members corresponding to each wheel are staggered on the bulge part and the non-bulge part, so that no friction is generated between the thigh bars connected to each other when the mechanical leg is walking.

10. The mechanical leg according to claim 4, wherein a groove is arranged on a part of the thigh bar near the second end; and
when the thigh bar is parallel to the ground, a part of the shank bar near the first end is located in the groove and is engaged with the thigh bar.

11. The mechanical leg according to claim 4, wherein the quantity of wheels is two, the two wheels are located on two opposite sides of the frame, and the auxiliary wheel is located on a side of the frame and between the two wheels; and
when leg joints of two retractable members connected to the same wheel are bent in opposite directions, the mechanical leg is in a first three-wheel mode; and when leg joints of two retractable members connected to the same wheel are bent in the same direction, the mechanical leg is in a second three-wheel mode; and
the leg joint of the retractable member is a rotary junction of the thigh bar and the shank bar of the retractable member.

12. A wheeled mobile device, comprising at least one mechanical leg, one of the at least one mechanical leg comprising a frame, a retractable member, a wheel, an extension and retraction driving member, a travel driving member, an auxiliary leg, and an auxiliary wheel,
wherein the extension and retraction driving member is located on a side of the frame, the retractable member is connected to the extension and retraction driving member, the wheel is connected to the retractable member and the travel driving member respectively, a first end of the auxiliary leg is connected to the auxiliary wheel, and a second end of the auxiliary leg is located on the frame; and
the retractable member is configured to drive the wheel to jump when being driven by the extension and retraction driving member to extend and retract, the wheel is driven by the travel driving member to move, and when the auxiliary wheel contacts the ground, the mechanical leg moves as the wheel and the auxiliary wheel roll.

13. The wheeled mobile device according to claim 12, the mechanical leg further comprising an auxiliary driving member, wherein the auxiliary driving member is located on the side of the frame, and the second end of the auxiliary leg is connected to an output shaft of the auxiliary driving member; and
the auxiliary leg is configured to extend to the side of the frame and retract to a position under the frame under the driving of the auxiliary driving member.

14. The wheeled mobile device according to claim 13, wherein the auxiliary leg is further configured to rotate relative to the frame under the driving of the auxiliary driving member to adjust the center of gravity of the mechanical leg.

15. The wheeled mobile device according to claim 12, wherein the retractable member is a linkage mechanism comprising a thigh bar and a shank bar; and
a first end of the thigh bar is rotationally connected to an output shaft of the extension and retraction driving member, a second end of the thigh bar is rotationally connected to a first end of the shank bar, and a second end of the shank bar is mounted on a drive shaft of the wheel by using a bearing.

16. The wheeled mobile device according to claim 15, wherein each wheel corresponds to two retractable members and two extension and retraction driving members, and the retractable members correspond to the extension and retraction driving members one to one.

17. The wheeled mobile device according to claim 16, wherein the mechanical leg further comprises an elastic member, and the elastic member is connected between a shank bar of a first retractable member of the two retractable members and a shank bar of a second retractable member of the two retractable members.

18. The wheeled mobile device according to claim 17, wherein the elastic member is a torsional spring, the torsional spring is sleeved on the drive shaft of the wheel, a first torsional arm of the torsional spring is connected to the shank bar of the first retractable member, and a second torsional arm of the torsional spring is connected to the shank bar of the second retractable member.

19. The wheeled mobile device according to claim 17, wherein the elastic member is a spring, one end of the spring is connected to the shank bar of the first retractable member, and the other end of the spring is connected to the shank bar of the second retractable member.

20. The wheeled mobile device according to claim 16, wherein the side of the frame comprises a bulge part and a non-bulge part; and
the two extension and retraction driving members corresponding to each wheel are staggered on the bulge part and the non-bulge part, so that no friction is generated between the thigh bars connected to each other when the mechanical leg is walking.

\* \* \* \* \*